US011681794B2

(12) United States Patent
Ganesan et al.

(10) Patent No.: US 11,681,794 B2
(45) Date of Patent: Jun. 20, 2023

(54) ASLR BYPASS

(71) Applicant: Oracle International Corporation, Redwood Shores, CA (US)

(72) Inventors: Dharmalingam Ganesan, Crofton, MD (US); David M. Clifton, Ellicott City, MD (US)

(73) Assignee: Oracle International Corporation, Redwood Shores, CA (US)

( * ) Notice: Subject to any disclaimer, the term of this patent is extended or adjusted under 35 U.S.C. 154(b) by 149 days.

(21) Appl. No.: 17/224,369

(22) Filed: Apr. 7, 2021

(65) Prior Publication Data
US 2022/0327201 A1 Oct. 13, 2022

(51) Int. Cl.
*G06F 21/54* (2013.01)
*G06F 12/06* (2006.01)
*G06Q 30/0601* (2023.01)
*G06F 21/57* (2013.01)

(52) U.S. Cl.
CPC .......... *G06F 21/54* (2013.01); *G06F 12/0646* (2013.01); *G06F 21/577* (2013.01); *G06Q 30/0633* (2013.01); *G06F 2212/1052* (2013.01); *G06F 2221/033* (2013.01)

(58) Field of Classification Search
CPC .... G06F 21/577; G06F 8/77; G06F 2221/033; G06F 8/30; G06F 8/20
See application file for complete search history.

(56) References Cited

U.S. PATENT DOCUMENTS

| | | | | |
|---|---|---|---|---|
| 7,287,140 | B1 * | 10/2007 | Asanovic | G06F 12/1483 711/208 |
| 7,552,477 | B1 * | 6/2009 | Satish | G06F 9/545 726/22 |
| 7,971,255 | B1 * | 6/2011 | Kc | G06F 21/566 713/188 |
| 9,245,110 | B2 * | 1/2016 | Deutschle | G06F 21/52 |

(Continued)

FOREIGN PATENT DOCUMENTS

CN 105740697 A 7/2016
WO WO-2021026938 A1 * 2/2021

OTHER PUBLICATIONS

Evtyushkin et al., Jump Over ASLR: Attacking Branch Predictors to Bypass ASLR, Published in: 2016 49th Annual IEEE/ACM International Symposium on Microarchitecture (MICRO), Date of Conference: Oct. 15-19, 2016, Date Added to IEEE Xplore: Dec. 15, 2016.

(Continued)

*Primary Examiner* — Meng Li
(74) *Attorney, Agent, or Firm* — Potomac Law Group, PLLC

(57) ABSTRACT

Embodiments bypass Address Space Layout Randomization (ASLR) executed on a web server that implements a web function. Embodiments, from a client remote from the web server, construct a stack layout of the web function. Embodiments identify memory locations of the stack layout that are writable and read a currently stored library instruction address of a library at the identified memory locations. Embodiments then iteratively increment the currently stored library instruction address by one and overwriting the identified memory locations until a remote shell is successfully spawned or another malicious instruction is executed.

20 Claims, 5 Drawing Sheets

(56) References Cited

U.S. PATENT DOCUMENTS

| | | | |
|---|---|---|---|
| 10,210,329 B1* | 2/2019 | Malik | H04L 63/1466 |
| 10,311,227 B2 | 6/2019 | Hughes et al. | |
| 10,489,308 B2* | 11/2019 | Bear | G06F 12/1063 |
| 10,554,685 B1* | 2/2020 | McArdle | G06F 11/1484 |
| 11,194,902 B2* | 12/2021 | Chen | G06F 21/552 |
| 2017/0206357 A1* | 7/2017 | Gorelik | G06F 21/566 |
| 2018/0314825 A1 | 11/2018 | Gathala et al. | |
| 2019/0243964 A1* | 8/2019 | Shukla | G06F 21/54 |
| 2019/0361815 A1 | 11/2019 | Tsirkin | |
| 2020/0089502 A1 | 3/2020 | Hong | |
| 2020/0372129 A1* | 11/2020 | Gupta | G06F 9/3842 |

OTHER PUBLICATIONS

Gras et al., ASLR on the LIne: Practical Cache Attacks on the MMU, NDSS '17, Feb. 26-Mar. 1, 2017, San Diego, CA, USA, Copyright 2017 Internet Society, ISBN 1-1891562-46-0, http://dx.doi.org/10.14722/ndss.2017.23271.

Lu, Threat Research Tutorial of ARM Stack Overflow Exploit—Defeating ASLR with ret2plt, FortiGuard Labs, Jul. 17, 2020.

Marco-Gisbert et al., return-to-csu: A New Method to Bypass 64-bit Linux ASLR, pp. 1-23, Mar. 2018.

Thompson, Threat Research, Six Facts about Address Space Layout Randomization on Windows, FireEye Inc, Mar. 17, 2020.

* cited by examiner

```
1  void add_order()
2  {
3      int len;
4      char* ptr;
5      char order[1024];
6
7      printf("Creating order no:%d\n", counter+1);
8
9      if(counter <= 99)
10     {
11         get_data(order, "Your order information");
12         len = strlen(order);
13         order[len-1] = 0;
14         ptr= buffer + (counter++ * 1024);
15         memcpy(ptr, order, len-1);
16         puts("Order has been added.");
17     }
18     else
19     {
20         puts("Error: Order queue is full.");
21     }
22 }
```

Fig. 4A

```
1  void update_order()
2  {
3      int order_id;
4      int len;
5      char* ptr;
6      char order[1024];
7
8      get_data(order, "Order ID");
9      order_id = atoi(order) - 1;
10
11     get_data(order, "Order information");
12     len = strlen(order);
13     order[len-1] = '\0';
14
15     ptr = buffer + order_id*1024;
16     memcpy(ptr, order, len-1);
17 }
```

Fig. 4B

```
void view_order()
{
    char* ptr = NULL;
    int count = 0;

ptr = buffer;
    while(*ptr)
    {
        printf("\nOrder no: %d\n"
               "                                    "
               "\n%s\n"
               "                                    "
               "\n\n",
               count+1, ptr);
        ptr = buffer + (++count * 1024);
    } puts("End of order list.");
}
```

Fig. 5A

```
int main() { define MAX_ITEMS 100
define BYTES_PER_ITEM 1024
define BUFFER_SIZE MAX_ITEMS * BYTES_PER_ITEM typedef struct {
  int status;
  char buf[BUFFER_SIZE];
  char menu_choice[2];
} Data;

Data data;

memset(data.buf, 0, BUFFER_SIZE);
buffer = data.buf;

while(data.status == 0) {
  display_menu();
  get_data(data.menu_choice, "Your option");
  data.status = check_option(&data.menu_choice);
} return 0;
}
```

Fig. 5B

ASLR BYPASS

FIELD

One embodiment is directed generally to computer security, and in particular to Address Space Layout Randomization computer security.

BACKGROUND INFORMATION

Address Space Layout Randomization ("ASLR") is one countermeasure against potential system exploits that makes it difficult for an attacker to predict the address of various program segments in memory. One method of implementing ASLR uses base address randomization for one or more segments of a library or application when the library or application is loaded into memory. The base address of the randomized segments can be randomized by a "slide" value each time the process is loaded into memory, or using any other method to revise the base address in a non-predictable manner. Therefore, ASLR provides one type of security to fend off malicious attacks.

SUMMARY

Embodiments bypass Address Space Layout Randomization (ASLR) executed on a web server that implements a web function. Embodiments, from a client remote from the web server, construct a stack layout of the web function. Embodiments identify memory locations of the stack layout that are writable and read a currently stored library instruction address of a library at the identified memory locations. Embodiments then iteratively increment the currently stored library instruction address by one and overwriting the identified memory locations until a remote shell is successfully spawned or another malicious instruction is executed.

BRIEF DESCRIPTION OF THE DRAWINGS

FIG. 4A illustrates pseudo-code implementing an "add_order" function for the shopping cart example in accordance with embodiments.

FIG. 4B illustrates pseudo-code implementing an "update order" function for the shopping cart example in accordance with embodiments.

FIG. 5A illustrates pseudo-code implementing a "view order" function for the shopping cart example in accordance with embodiments.

FIG. 5B illustrates pseudo-code implementing a "main" function for the shopping cart example in accordance with embodiments.

DETAILED DESCRIPTION

Embodiments bypass an Address Space Layout Randomization ("ASLR") implemented software program by identifying the location of a library return address in the virtual memory of a web server. The location is then continuously incremented by one until a remote shell of the library is spawned. The incrementing can be performed in parallel in order to increase the speed of the bypassing. During ethical hacking and security testing, there is often a need to overcome ASLR, which randomizes the address space of the program under attack.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
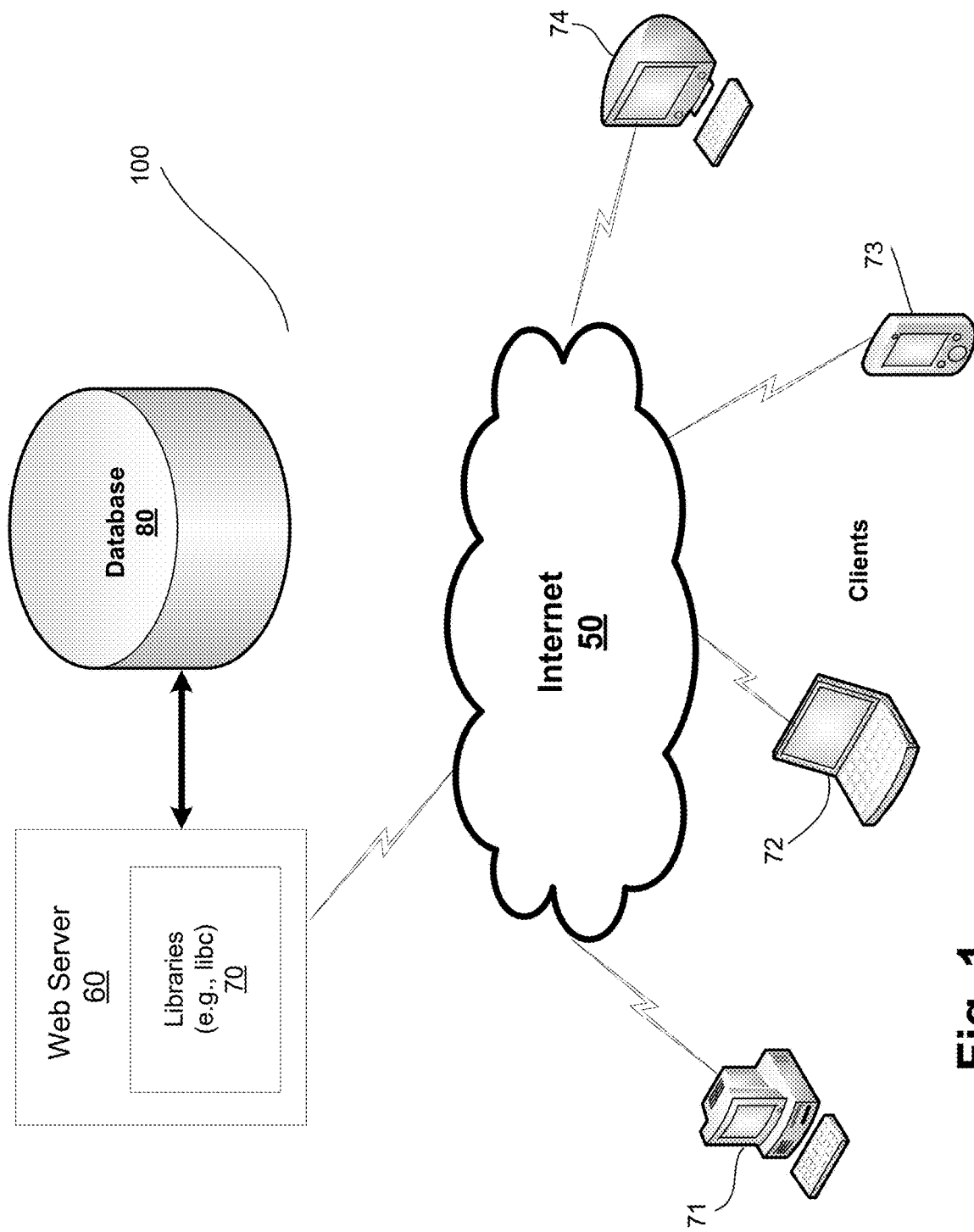
FIG. 1 is a block diagram that illustrates a system in accordance to embodiments of the invention.

FIG. 1 is a block diagram that illustrates a system 100 in accordance to embodiments of the invention. System 100 includes a web server 60 in communication with a database 80. Web server 60 is a computer executing server software, or a system of one or more computers dedicated to running this software, that can satisfy client Hypertext Transfer Protocol ("HTTP") requests from the Internet 50 and/or from private local area networks ("LANs") and wide area networks ("WANs"). Web server 60 stores and delivers web content and/or web resources, including using database 80 for content storage needs. The HTTP requests can be received from one or more clients 71-74. A client can be any device that executes a web browser or other functionality that enables that device to generate and submit HTTP requests to web server 60.

In embodiments, web server 60 includes and executes libraries of functions. The type of libraries can differ depending on which operating system is being executed by web server 60. In one embodiment, the operating system is Unix/Linux or Unix-like, or any other C programming language based operating system, and includes the C standard library, also referred to as "libc". Libc is the fundamental library for all C programs. Further, in embodiments, web server 60 implements ASLR as a security mechanism.

A known "attack" on web server 60 can involve a "return-to-libc" attack, but this is difficult to perform when ASLR is turned on. In the return-to-libc attack, the attacker changes the control flow of a vulnerable program by redirecting the program's flow to an instruction present in the libc library code. Libc is Turing complete, meaning instructions in libc are sufficient to simulate a Turing machine, which is a mathematical model of a computer. Therefore, return-to-libc is an attractive hacking strategy for attackers because they can spawn shells and/or elevate privilege using the instructions of libc. Security researchers have observed that libc has instructions to spawn an interactive shell, for example.

Figure 2:
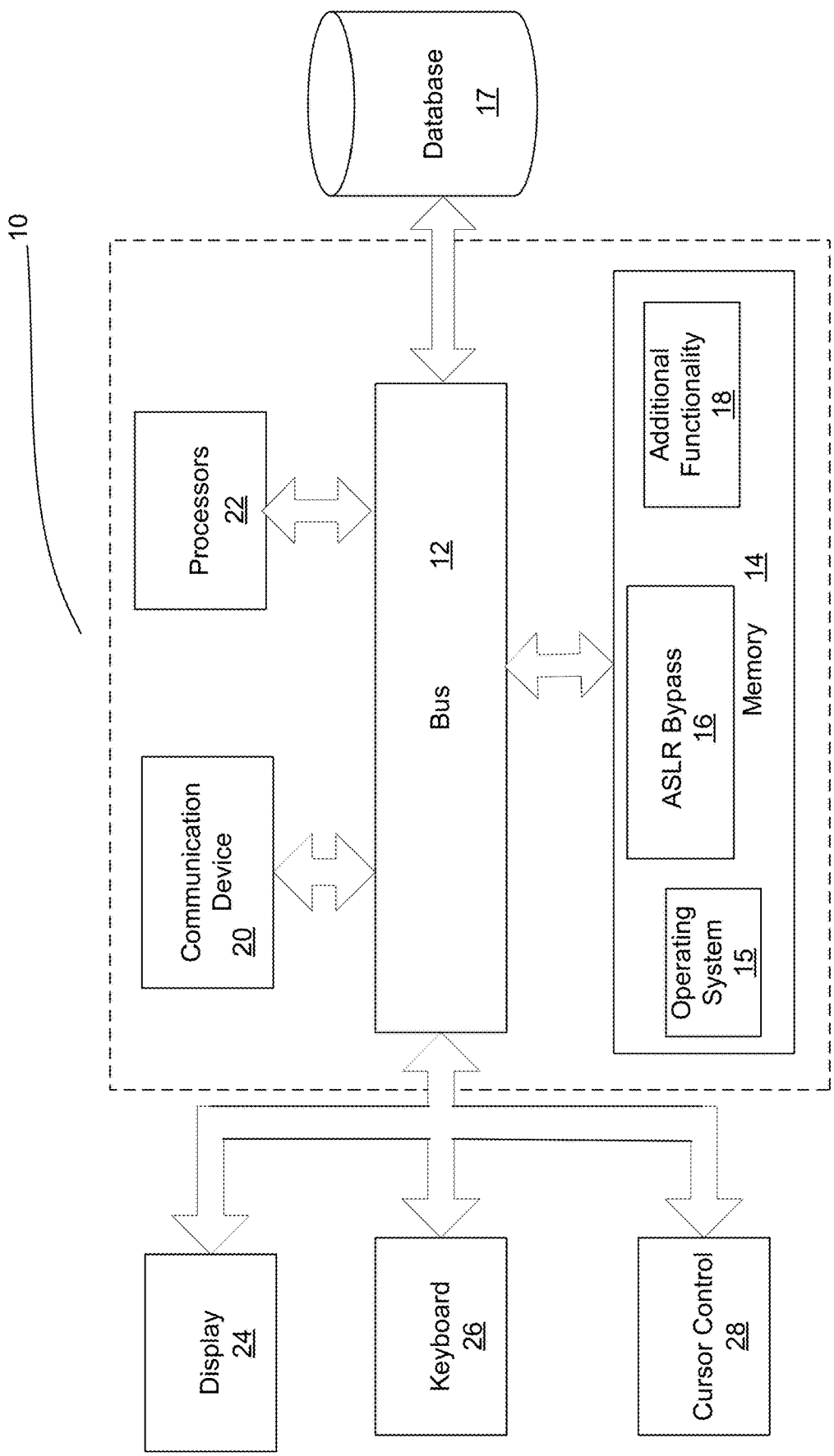
FIG. 2 is a block diagram of one or more of clients in accordance with an embodiment of the present invention.

FIG. 2 is a block diagram of one or more of clients 71-74 in accordance with an embodiment of the present invention. Although shown as a single client/system, the functionality of system 10 can be implemented as a distributed system. Further, the functionality disclosed herein can be implemented on separate servers or devices that may be coupled together over a network. Further, one or more components of system 10 may not be included. System 10 can be used to implement any of the components shown in FIG. 1 and/or interact with any of the components.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an ASLR bypass module 16 that implements ASLR bypass, and all other functionality disclosed herein. System 10 can be part of a larger system, such as an ethical hacking or security testing system that has a need to bypass ASLR at web server 60. Therefore, system 10 can include one or more additional functional modules 18 to include the additional functionality. A file storage device or database 17 is coupled to bus 12 to provide centralized storage for modules 16 and 18. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based system, a software-as-a-service ("SaaS") architecture, or other type of computing solution.

As discussed, ASLR is a type of security control to make hacking difficult because the memory addresses of different segments (e.g., stack, heap) are randomized and addresses vary between different runs (i.e., different accesses of the memory space or different transaction attempts). Therefore, potential attackers cannot easily predict the memory addresses of variables and binary code segments (i.e., instructions) when exploiting security vulnerabilities due to buffer overflow or format-string vulnerability problems, for example. ASLR is usually a very effective security control, especially for 64-bit machines, because it is difficult to brute-force and guess the run-time address of a variable or an instruction due to the large space of possible addresses. In a 64-bit machine, addresses are 64-bits. However, not all 64-bits are actually used. In Linux, for example, user-space programs' addresses have only 47-bits. Nevertheless, the address space is still very large, making it challenging for hackers to guess the run-time address of an instruction or a variable correctly (i.e., up to $2^{47}$ guesses may be required in a 64-bit machine).

Embodiments provide a system and functionality to overcome/bypass/thwart ASLR for interactive programs by one or more of clients 71-74 in which the client sends a request to web server 60, and, based on the response, constructs subsequent requests. Embodiments are useful for ethical hacking, penetration testing, automated security testing, and automated payload generation. Any software program with ASLR turned on and that is vulnerable to buffer overflow and format-string vulnerabilities can be exploited using embodiments of the invention.

Embodiments are applicable to programs that allow an "attacker" client to read arbitrary memory segments and subsequently allow them to write to locations such as function pointers, the return address of a function invocation event, etc. In order to write an address to a memory location, the client needs to know the precise address of another instruction they want to execute. Embodiments are amenable to searching for a valid address in parallel in which the address space is searched in parallel on multiple machines/bots/clients. Therefore, embodiments allow a user to spawn remote shells or execute other "malicious" code in the presence of ASLR.

ASLR randomizes the base addresses of different memory segments. However, by necessity, the memory layout of different instructions and variables is the same between runs. For example, if an instruction "f" has an address smaller than the address of another instruction "g", this constraint is always maintained even if ASLR is turned on. This constraint cannot be randomized because otherwise the software functionality will fail. Embodiments leverage this constraint to overcome/bypass ASLR.

Libc, like many other libraries, is a relatively small library. However, the attacker needs to guess the correct base address where libc is loaded at run-time. This is not an easy task when attackers are performing remote code execution, without having a physical access to the system under attack.

Attackers also have to find the address of the instruction that can spawn a remote shell or other malicious code (e.g., reset a machine). Embodiments take advantage of the fact that the binary size of a typical libc program is only approximately 300,000 bytes. Therefore, in embodiments, an interactive program that allows attackers to read a return address, stored on the stack, and allows them to update the return address will only require at most 600,000 attempts to break into, in order to execute a shell spawning instruction (i.e., an instruction stored in libc). In experimental results, even at the maximum of 600,000 attempts to guess an address, in less than 6 hours embodiments were able to successfully spawn a remote shell on a machine (e.g., web server 60) from any of clients 71-74 for which physical access to web server 60 is not available.

Further, embodiments can implement parallelization of the attempts by distributing the exploration of the address space on multiple bots or clients, each bot searching only a small space of possible addresses. For example, one bot could read the current return address of a vulnerable function, update the return address by adding one to it, if this fails, add two to the original return address, and continue to add until, for example, 25,000 is reached. The second bot, in parallel, may start from 25,001 to the current return address and continue in the same manner. The third bot, in parallel, may go backwards by subtracting the current address by 1, continue like the other bots but backwards. Therefore, using multiple bots/clients, the brute-force technique is guaranteed to locate the precise run-time address of the shell spawning instruction, for example.

Figure 3:
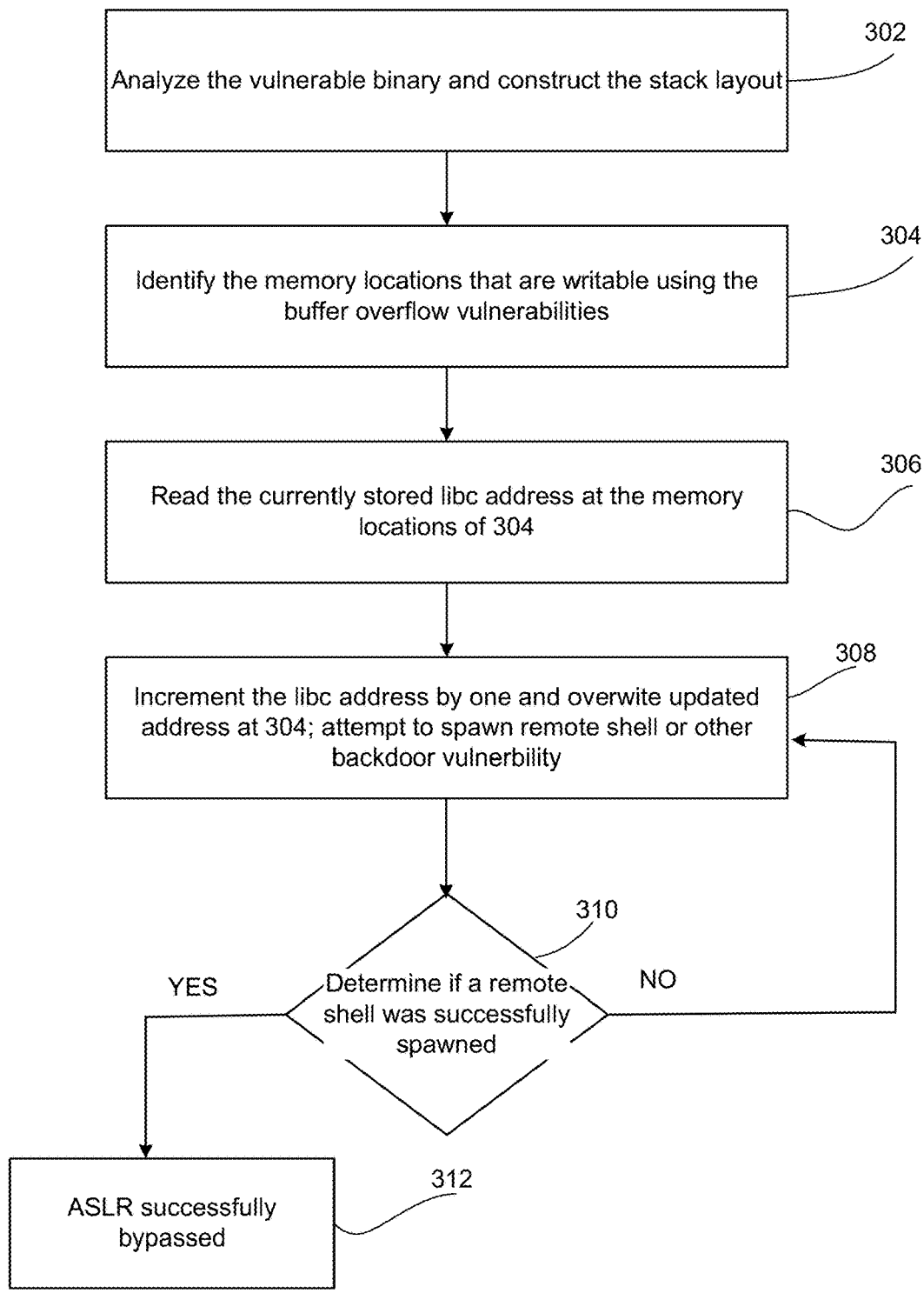
FIG. 3 is a flow diagram of the functionality of the ASLR bypass module of FIG. 2 when bypassing ASLR on a remote web server in accordance with one embodiment.

FIG. 3 is a flow diagram of the functionality of ASLR bypass module 16 of FIG. 2 when bypassing ASLR on a remote web server in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, embodiments analyze the vulnerable binary and construct the stack layout. If the binary is not available, embodiments use any known fuzzing tools to identify buffer overflow vulnerabilities and reconstruct the stack layout. Fuzzing or fuzz testing is an automated software testing technique that involves providing invalid, unexpected, or random data as inputs to a computer program. The program is then monitored for exceptions such as crashes, failing built-in code assertions, or potential memory leaks. Example known fuzzing tools include "American Fuzzy LOP" and "Radamsa". For example, the following is an example stack layout for an example function, which in this case is a shopping cart web service, described in more detail below:

---
RET address to LIBC
RBP of libc (Base frame pointer)
1024 bytes (menu options: view, update, add, exit)
1024 × 100 bytes (for 100 items)
4 bytes (return code of check order function)

---

As shown, the libc is the C runtime library that starts the main function. When the main function terminates, the control will be returned to the return address ("RET address") of the libc, which due to ASLR changes every time the function is executed. The run-time memory layout of the main function is as follows. Due to the interactive nature of this vulnerable web service, the user/attacker can browse the remote stack and obtain the current return address of the main function. The main function returns to the libc code, which is how C programs on Linux run. The attacker's goal is to overwrite the currently stored libc address by a different address, such as the address of the shell instruction which is part of libc.

At 304, the memory locations that are writable are identified using the buffer overflow vulnerabilities. For example, locations that contain function pointers or the return address of a function that contains the address of any libc instruction. Write memory locations are identified by either analyzing the binary code for specific functions such as array writing, memcpy, gets, etc. In the shopping cart example disclosed below, the update and add items menu options update the state of the shopping cart memory by writing to particular memory locations that contain the buffer. If the binary code is not available, fuzzing can be used to learn potential memory locations that are writable.

At 306, the currently stored libc instruction address is read at the location identified at 304.

At 308, the currently stored libc instruction is incremented by one and the updated address at the location identified at 304 is overwritten. An attempt is then made to spawn a remote shell or other backdoor vulnerability (i.e., a malicious instruction).

At 310, the remote shell is determined whether it was spawned successfully. As discussed, libc contains instructions to spawn a remote controllable shell. If yes, then at 312 ASLR is thwarted/bypassed successfully. If no, then the incremented address is pointed to a wrong instruction and functionality resumes at 308 where the currently stored libc instruction address is again incremented by one more than the last attempt.

306, 308, 310 and 312 can be performed in parallel by multiple clients/bots as follows: Assign each bot a range of address values to explore. For example, bot 1 will try to spawn a shell by incrementing the currently stored libc instruction address in a given interval [1, 10000]. On the other hand, bot 2 will explore in a different interval [10000, 20000]. This is a parallel search to cover the entire instruction set of libc, which has only approximately 300,000 possible addresses even when ASLR is turned on.

As an example of the functionality of embodiments, assume that web server 60 implements a shopping cart web service, and the shopping cart is implemented in the C programming language. The shopping cart allows the user to add an item, update an existing item, and view the existing items in the cart. For simplicity, assume the shopping cart has a configured limit on the maximum number of items of 100. When the user adds an item to the cart, the internal counter, which keeps track of the current number of items in the cart, will increment by one. The user can also update an existing order by sending the item id (which is a number between 0 and 99, inclusive) to the update order interface. The user can also view the cart's content by using the view order service.

The behavior of the web service is determined by the choice (add, update, and view) sent by the user. For example, the user should send a choice of '1', '2', and '3' in order to view, add, and update existing orders, respectively; (i.e., the "check_option" function below). The user can close the shopping cart web service by sending a '4' to it. The "check_option" function shown in the following pseudocode captures these options.

```
int check_option(char* menu_choice)
{
    switch(*menu_choice)
    {
        case '1' :
            view_order( );
            break;
        case '2' :
            add_order( );
            break;
        case '3' :
            update_order( );
            break;|
        case '4' :
            return 1;
        default:
            puts("\nInvalid option.\n");
    }
    return 0;
}
```

If the user sends '1', the web service will reply by sending the current orders in the cart. If the user sends '2', then the web service would expect more data, namely the details of the new order to add. After successfully adding the item to the cart, the web service replies with an item number, in the range of 0-99. If the user sends '3', then the details to update the existing item number, in the range of 0-99, should also be sent to the web server which will update the order.

For each connection from the user, the web service maintains the state of the shopping cart using two global variables, namely the "buffer", and "counter". The web service allocates a fixed amount of memory for each item, for example 1024 bytes. Thus, in total, a 1024*100 bytes (i.e., 102,400 bytes) chunk of memory (i.e., buffer) is needed for each shopping cart to hold at most 100 items. There is a global pointer that points to this chunk. The counter variable is used by the web service to identify a particular item on the cart. For example, to extract the details of item number 3, the web service extract the bytes in the range of buffer [1024*item_number . . . 1024*item_number+1024], where that item number is a number in the range 0-99.

The state variables of the shopping cart are summarized as follows:
 int counter=0; /*Keeps track of the number of items in the cart*/
 char* buffer=NULL; /*keeps track of the content of the cart*/

The counter is an integer variable, denoted by the "int counter" statement. The statement "char* buffer" denotes that the buffer is pointing to an array of characters. The "buffer" is initialized to NULL because initially there is nothing in the cart. The main function, disclosed below, is initializing the buffer to a valid address.

FIG. 4A illustrates pseudo-code implementing an "add_order" function for the shopping cart example in accordance with embodiments. The add_order function is for adding an order to the shopping cart. The function will read the user input of order details and update the state variables. At line 5, the function allocates 1024 bytes to read the order details. If the counter value is below 100, at line 11, the function reads the user input of at most 1024 bytes and then appends the input to the global buffer using the "memcpy" function, which is part of the standard C library.

FIG. 4B illustrates pseudo-code implementing an "update order" function for the shopping cart example in accordance with embodiments. At line 8, the function asks the user for the order id to be updated. At line 15 and 16, it updates the global buffer by traversing the correct byte location, using the order id.

One of the security problems is at line number 8 of FIG. 4B where the code trusts the order id sent by the client. If the input order id is outside the allowed range [0, 99] mentioned earlier, then the attacker can corrupt the memory of the web service and could execute malicious code by changing the control flow of the service.

FIG. 5A illustrates pseudo-code implementing a "view order" function for the shopping cart example in accordance with embodiments. At line 6, the pointer is pointing to the global buffer. The while loop traverses the buffer and prints 1024 bytes, corresponding to each item on the cart, until the NULL byte is met.

There is a subtle security problem in the view order function because it does not check whether the pointer to the buffer is out of the bound. More precisely, this function does not check whether the max number of items is bounded by 100. The consequence is that the attacker will be able to view the content of the web service's memory which contains not only the shopping cart data but also other confidential information such as the return address and other private data that should not be exposed to the attacker.

FIG. 5B illustrates pseudo-code implementing a "main" function for the shopping cart example in accordance with embodiments. The main function integrates all the core functions of the shopping cart web service that are described above. Lines 7 through 11 declare a structure that contains three attributes: "status", "buf", and "menu_choice". The status attribute is used to store the status returned by the "check_option" function. The buf array attribute is used to store the shopping cart content. The menu_choice attribute is used to store the menu choice (e.g., add, update, or view) that was chosen by the user.

At line number 15, the buf array is initialized to NULL. At line 16, the global buffer pointer is initialized with the address of the buffer.

The core of the main function is the while loop from lines 18 through 21. The main function keeps running until the user selects the choice to exit the shopping cart service. In each iteration of the loop, the main function displays the menu of choices such as add, update, or view the order (see line number 19). The choice sent by the user is passed to the check_option function which executes add, update, or view the order. The while loop, and thus the program, terminates if the user sent an option to exit the shopping cart. The code of "display_menu" is not shown because it is not important for the security vulnerability previously described.

Therefore, as disclosed, there are two security vulnerabilities in the shopping cart web service. These two vulnerabilities allow an attacker to write to arbitrary memory as well as read the memory content. Embodiments of the invention can be used to exploit these vulnerabilities in order to bypass ASLR.

Specifically per 302 of FIG. 3, the stack layout of the main function is constructed by browsing the remote stack. The actual stack layout depends on the binary of the source code but the following (and the stack layout disclosed above) is illustrative of how elements are laid out in memory at runtime.

RET address to Libc
RBP of Libc
102400 bytes (for 100 items)

The libc is the C runtime library that starts the main function. Thus, when the main function terminates, the control will be returned to the return address ("RET address") of the libc. This is how procedure calls generally operate. However, if the attacker manages to corrupt the RET address by another address, then control will transfer to that address.

Since the update order function is not checking whether the input order number is outside the allowed range, the attacker can send any order number of choice and overflow the buffer. Thus, the attacker can reach the RET address and corrupt it by another address.

The challenge is that the user/attacker needs to find another valid address which contains meaningful code such as a remote shell (i.e., a malicious process) to execute arbitrary commands. The libc library, which is part of every runtime system, contains a large amount of valuable code, including a command and control remote shell. However, the attacker needs to know the exact memory address of such a code. If the address space layout is randomized (i.e., ASLR), the attacker would not normally be able to guess the correct address.

In embodiments, the stack layout has to be first constructed/reconstructed per 302. If the binary is available, which is the case for open source software, then the attacker can reconstruct the stack layout. In the shopping cart example, the attacker's goal is to overwrite the stack location that contains the return address to libc. The attacker can obtain the write location easily at 304 because the web server was allowing the attacker to browse the stack, which contains the return address and other program flow control data.

Specifically, if the system under attack, such as the shopping cart example, allows the attacker to view the memory stack, then the attacker can first browse the stack and read the current value of the RET address of libc (306 of FIG. 3). Then, the user adds one to the current return address (308 of FIG. 3) and overwrites the return address by overflowing the buffer, which is possible if the vulnerable web service allows arbitrary memory write. If the overwritten return address is invalid, the web server will likely crash (no at 310 of FIG. 3). In that case, the user can repeat the above process (repeat 308 of FIG. 3), meaning instead of adding one to the current return address the user will add two to it. The user continues until the backdoor shell is spawned on the server (yes at 310 of FIG. 3). Once such a shell is spawned the user can run arbitrary commands remotely (312 of FIG. 3).

The following pseudo-code can be used to implement embodiments of the invention. As disclosed, embodiments involve a search technique to exploit security problems that allow a currently stored libc address to be overwritten as follows. The search script take the current address of libc instruction and 125000 through 135000. The current address of libc is remotely available because the user can browse the shopping cart and there is no limit check on the item number. The search is terminated as soon the desired instruction address of a remotely controllable command line shell is detected and spawned.

```
for i in 'seq 125000 135000';
do
  timeout 2s ./break_shopping_cart $i;
  status=$?;
  if [ $status -eq 0 ];
  then echo $i; break; fi;
```

```
  if [ $status -eq 124 ]; then echo $i >> killed.txt; fi;
  if [ $status -eq 3 ]; then echo $i >> server_down.txt; fi;
done
```

The above "break_shopping_cart" exploit pseudo-code prepares the payload and sends it to the shopping cart web service. As shown below, the search found a match at 125239 bytes away from the current libc return address because it echoed back a string that was placed as part of the exit order option. This illustrates that embodiments can run any malicious code, without even having a copy of the actual libc and, further, with ASLR in action, too.

```
TEST SUCCESS 125239
: 4: command not found
TEST
total 40
dr-xr-x--- 2 delivery delivery 4096 May 25 06:04 .
drwxr-xr-x 6 root root 4096 Jun 8 12:01 ..
-rw-r--r-- 1 delivery delivery 21 Nov 23 2015 .bash_logout
-rw-r--r-- 1 delivery delivery 57 Nov 23 2015 .bash_profile
-rw-r--r-- 1 delivery delivery 161 Apr 19 17:07 .bashrc
-r-xr-xr-x 1 delivery delivery 10288 May 24 18:08 delivery
-r-xr-xr-x 1 delivery delivery 85 May 25 06:04 delivery_launcher
```

Embodiments are able to overcome ASLR because: (a) the libc library is small yet contains valuable code to spawn a backdoor shell; and (b) the user will eventually find the correct address because the user is incrementing the current return address to libc by one. This strategy will cover the entire address space of libc very easily.

As shown in the above example, the user/attacker can add 100 items to the shopping cart by using the menu option to add items. Further, the attacker can also update the cart by sending a wrong item id that is outside the allowed range of 1 through 100. For example, the remote user at one of clients 71-74 can send a request to update item number 110, which is an invalid number. However, web server 60 does not check the validity of the request. In order to browse the stack, the attacker can update the shopping cart until the buffer that contains the return address is reached. Then, the attacker can use the view items option which shows not only the shopping cart but also the return address of libc because the view items sends out all the stack content until the null byte is reached. This is how the attacker can "browse" the content of the remote stack per 302 of FIG. 3. The attacker's client program will send out a payload to first fill up the buffer of the shopping cart and then send another request to view the shopping cart. Based on the response, the client program will know the current stack content, which includes the address of the libc function stored on the stack. The client program will send out a new request to update the stack, taking into consideration the current libc function address and increment by one. If this fails, meaning the web service crashed, for example, the client program will start again but will increment the libc function address by two instead of one. This process continues until a remote shell is spawned which can checked by sending a simple echo command.

Embodiments are also parallelizable as follows. The user can use multiple client machines (e.g., bots) to target the server. Each bot can explore a small space of possible addresses. For example, bot 1 may increment the current return address by one for 10,000 steps, while bot 2 may increment the current address by 15,000 and increment by one until 30,000 attempts were made. In other words, different bots are searching the state space of the possible address in parallel but in a systematic manner.

Although embodiments disclosed above are in in conjunction with a return-to-libc attack, embodiments can also be applied in other attack scenarios. Embodiments can be used to change the control flow of an interactive vulnerable program by jumping to other libraries in addition to libc, as long as those libraries have a base address that varies between runs due to ASLR. Further, embodiments are not limited to buffer overflow attacks. Embodiments can also be used to exploit insidious format-string vulnerabilities, since exploiting them also requires obtaining the precise run-time address to change the control flow. Further, any writable memory location can be updated with a malicious address using the search technique of embodiments, with the precondition that the vulnerable interactive program allows the attacker to read from and write to the current content of the memory location.

As disclosed, embodiments systematically overcome ASLR during security testing and ethical hacking. Embodiments are especially applicable to interactive, vulnerable programs such as communication protocols and web services that are remotely accessible. Embodiments are inherently parallelizable in that the address of a malicious instruction or the location of string constants (e.g., "/bin/sh") can be automatically located when ASLR is turned on.

Embodiments are applicable to exploiting buffer overflow problems which are difficult to exploit when ASLR is turned on. Embodiments can be used in conjunction with return-to-libc and other return-to-code attacks used in practice. Embodiments are applicable to exploiting format-string problems which also require the address of malicious instruction to be available. Embodiments are useful for automated payload generation during ethical hacking as well as for security tool development.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of bypassing Address Space Layout Randomization (ASLR) executed on a web server that implements a web function, the method executed from a client remote from the web server and comprising:
   constructing a stack layout of the web function;
   identifying memory locations of the stack layout that are writable;
   reading a currently stored library instruction address of a library at the identified memory locations; and
   iteratively incrementing the currently stored library instruction address by one and overwriting the identified memory locations until a remote shell is successfully spawned or another malicious instruction is executed.

2. The method of claim 1, wherein the library comprises a libc library.

3. The method of claim 1, wherein the overwriting comprises a request to update a stack of the stack layout.

4. The method of claim 3, wherein the remote shell is successfully spawned when a location of the stack of a return address of the library is overwritten.

5. The method of claim 1, wherein the iteratively incrementing is implemented by a plurality of clients remote from the web server in parallel.

6. The method of claim 5, each of the plurality of clients assigned a different portion of an entire instruction set of the library.

7. The method of claim 1, wherein the stack layout of the web function includes a return address of the library, and the ASLR changes the return address every time the web function is executed.

8. The method of claim 1, the overwriting comprising using an address of a shell instruction of the library.

9. The method of claim 1, wherein the web function is a function of a shopping cart web service, the web function comprising viewing an order, adding to the order, or updating the order.

10. A non-transitory computer readable medium having instructions stored thereon that, when executed by one or more processors, cause the processors to bypass Address Space Layout Randomization (ASLR) executed on a web server that implements a web function, the computer readable medium executed from a client remote from the web server, the bypassing comprising:
    constructing a stack layout of the web function;
    identifying memory locations of the stack layout that are writable;
    reading a currently stored library instruction address of a library at the identified memory locations; and
    iteratively incrementing the currently stored library instruction address by one and overwriting the identified memory locations until a remote shell is successfully spawned or another malicious instruction is executed.

11. The computer readable medium of claim 10, wherein the library comprises a libc library.

12. The computer readable medium of claim 10, wherein the overwriting comprises a request to update a stack of the stack layout.

13. The computer readable medium of claim 12, wherein the remote shell is successfully spawned when a location of the stack of a return address of the library is overwritten.

14. The computer readable medium of claim 10, wherein the iteratively incrementing is implemented by a plurality of clients remote from the web server in parallel.

15. The computer readable medium of claim 14, each of the plurality of clients assigned a different portion of an entire instruction set of the library.

16. The computer readable medium of claim 10, wherein the stack layout of the web function includes a return address of the library, and the ASLR changes the return address every time the web function is executed.

17. The computer readable medium of claim 10, the overwriting comprising using an address of a shell instruction of the library.

18. The computer readable medium of claim 10, wherein the web function is a function of a shopping cart web service, the web function comprising viewing an order, adding to the order, or updating the order.

19. An Address Space Layout Randomization (ASLR) bypass system comprising:
    one or more client computers in remote communication with a ASLR enabled web server that implements a web function, each client computer comprising a processor that executes instructions to:
    construct a stack layout of the web function;
    identify memory locations of the stack layout that are writable;
    read a currently stored library instruction address of a library at the identified memory locations; and iteratively increment the currently stored library instruction address by one and overwriting the identified memory locations until a remote shell is successfully spawned or another malicious instruction is executed.

20. The system of claim 19, wherein the iteratively incrementing is implemented by a plurality of the clients in parallel, each of the plurality of clients assigned a different portion of an entire instruction set of the library.

* * * * *

UNITED STATES PATENT AND TRADEMARK OFFICE
CERTIFICATE OF CORRECTION

PATENT NO. : 11,681,794 B2
APPLICATION NO. : 17/224369
DATED : June 20, 2023
INVENTOR(S) : Ganesan et al.

It is certified that error appears in the above-identified patent and that said Letters Patent is hereby corrected as shown below:

On the Title Page

On page 2, Column 1, under Other Publications, Line 7, delete "retum" and insert -- return --, therefor.

In the Drawings

On sheet 3 of 5, in FIG. 3, and on the Title Page, the illustrative print figure, under Reference Numeral 308, Line 1, delete "overwite" and insert -- overwrite --, therefor.

On sheet 3 of 5, in FIG. 3, and on the Title Page, the illustrative print figure, under Reference Numeral 308, Line 3, delete "vulnerbility" and insert -- vulnerability --, therefor.

Signed and Sealed this
Second Day of April, 2024

Katherine Kelly Vidal
*Director of the United States Patent and Trademark Office*